Oct. 7, 1947.　　　　W. C. VAN GEEL　　　　2,428,400
BLOCKING LAYER CELLS COMPRISING ONE OR MORE GRIDS
EMBEDDED IN THE BLOCKING LAYER
Filed Jan. 18, 1943

Inventor:
WILLEM C. VAN GEEL

By: *G. F. Ostendorf*
Attorney

Patented Oct. 7, 1947

2,428,400

UNITED STATES PATENT OFFICE 2,428,400

BLOCKING-LAYER CELLS COMPRISING ONE OR MORE GRIDS EMBEDDED IN THE BLOCKING LAYER

Willem Christiaan van Geel, Eindhoven, Netherlands, assignor to Hartford National Bank and Trust Company, Hartford, Conn., as trustee Application January 18, 1943, Serial No. 472,779
In the Netherlands August 2, 1940

Section 1, Public Law 690, August 8, 1946.
Patent expires August 2, 1960

6 Claims. (Cl. 175—366)

This invention relates to a blocking-layer cell comprising one or more grids embedded in the blocking layer.

In blocking-layer cells, like in grid-controlled vacuous and gaseous discharge tubes, the influence of the grids on the electronic current between the cathode and the anode is determined by the distance between the grid and the anode and by the surface of that part of the grid which is located in the path of the electrons. Consequently, in constructing a blocking-layer cell with a grid a definite grid surface is chosen for the conditions for which the cell is designed. However, in contra-distinction to the above-mentioned tubes, in blocking-layer cells particular difficulties arise which are due to the fact that the grid is embedded in a film of, say, about 5 microns and that it is required to have itself also a small thickness of, for example, 0.1 to 1 micron. Consequently, a strip-shaped or wire-shaped body which serves as a supply conductor for the grid and is located in the blocking layer may considerably affect the control since an electronic current flows from this supply conductor to the anode. The proportion of the grid-anode current which is supplied by the supply conductor may be rather considerable since the surface of the grid is in many cases comparatively small.

The present invention has for its purpose to largely eliminate this drawback. According to the invention this is achieved by the metallic supply conductor for the grid being arranged in the cell in such manner that the distance through the cell between the supply conductor and the anode is larger than the distance between the associated grid and the anode.

In this case the following consideration applies. The grid in a cell consists of a more or less conductive material which consequently possesses free electrons. If the potential of the anode is higher than that of the grid, this results in grid emission. The magnitude of this emission is a function of the potential difference between the grid and the anode and also of the distance between these two components. If the grid is made of material which, though sufficiently conductive for the application of the grid potential, has a poor electron-emitting power, this drawback is obviated. It is, however, evident that the same problem also occurs with the supply conductor for the grid, especially since it will consist of material which is conductive and has a proper emitting power, for example brass. Now, the construction according to the invention obviates this drawback of emission of the grid-supply-conductor, since the large distance between the grid supply-conductor and the anode renders the field intensity between these two components so small that practically no emission occurs.

Further the following circumstance, too, is of importance.

As is well-known, the capacity of two metallic parts which are separated from one another by an insulator is influenced by the spacing between them. Since, according to the invention, at those points where the supply conductor for the grid is located, said spacing is larger than the distance between the grid and the anode, the capacity influence of the supply conductor is also very small.

It has already been remarked that the supply conductor is generally very thin since it has, for example, the form of a thin wire, a strip or a foil. The natural mechanical rigidity is consequently very small, so that it is desirable for the conductor to be supported as far as possible.

In one advantageous embodiment of the invention the blocking-layer cell is so constructed that the supply conductor for the grid is separated from the anode by a coating of insulating material having a thickness greater than the distance between the associated grid and the anode.

This construction consequently permits of the conductor bearing on the insulating layer, while nevertheless the distance between the conductor and the anode is maintained at the proper length. The thickening of insulating material may at the same time be utilised for the rigid fastening of the supply conductor, for which purpose the grid, which consists of a very thin layer, is less suitable. This is achieved by the supply conductor being attached in or to a quantity of low-melting metal applied to the thickening of insulating material, while the grid extends under this low-melting material or across the surface thereof.

Another advantageous form of construction consists in that the anode re-enters at the point where the supply conductor is located and this consequently also ensures that the distance between the grid-supply-conductor and the anode is maintained so large that the above-described drawbacks do not occur.

In order that the invention may be more clearly understood and readily carried into effect, it will be explained more fully by reference to the accompanying drawing showing the above-mentioned and further elaborated embodiments.

Figure 4:
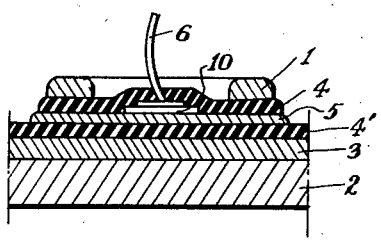

In Fig. 4 also the anode re-enters in a direction normal to the electron path, the supply conductor being led through the anode.

Figure 5:
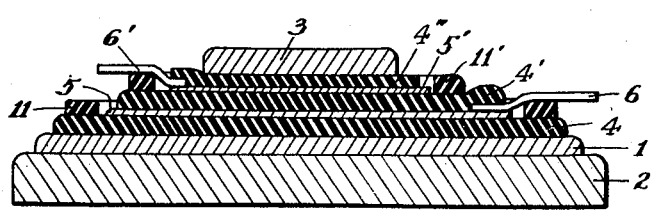

Fig. 5 shows a form of construction of a cell comprising a plurality of grids.

In all figures the anode is designated by the numeral 1, the carrier-plate by 2, the cathode by 3, the blocking layers by 4, 4', and 4", the grids by 5, 5' and the associated supply conductors by 6, 6'.

Figure 1:
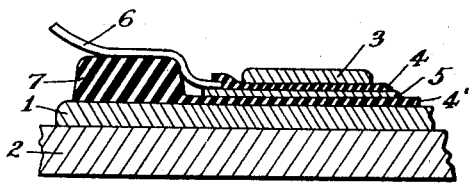
Fig. 1 shows diagrammatically a cell in which the blocking-layer which separates the grid from the anode has a thickening.

Referring first to Fig. 1, the anode 1 which may consist of selenium, is carried by an aluminium carrier-plate 2. The diameter of the circular plate and of the selenium electrode is, for example, 1 cm. After the selenium has been converted into the crystalline modification, there is applied polystyrene from a solution in benzene so as to form a film 4' having a thickness of, for example, 5 microns. This thickness may be predetermined by starting from a definite quantity of the solution, of which the concentration is known.

Now, the film 4' has made on it an elevation 7 which has a surface corresponding to that of the supported surface of the supply conductor. The elevation may also be made, however, in the form of an annular edge surrounding the blocking layer 4'. The part 7 may be made from the same polystyrene solution as the film 4' by painting the solution by means of a pencil at the point where the elevation must be applied, and vaporisation of the solvent. This process may be repeated until the total number of layers produced gives the thickness desired.

Now, a coating of brass is condensed from the vapour state over a small surface on the film 4', this brass being subsequently converted into brass iodide under the action of iodine vapours so that a grid of semi-conductive material is formed.

The grid has provided on it a brass supply-conductor 6 which covers the grid only for so small a portion as is necessary for the electric contact. For obtaining a better electric contact the supply conductor 6 may alternatively be arranged before the brass is applied by vaporisation, so that the extremity lies under the grid. The conductor 6 is mechanically supported by the elevation 7, the action of this conductor on the electrical properties of the cell being practically eliminated since the height of the part 7 is much greater than the thickness of the layer 4'. The strip 6 may be fastened to the elevation 7, for example, by utilising polystyrene as an adhesive.

Now, in a manner similar to that described above a second blocking-layer 4 is applied on to the grid. One preferably proceeds in such manner that use is made of another insulating substance, such as Canada balsam, which dissolves in toluene and in which polystyrene does not dissolve. This manner of application of the second film prevents the first film 4' from being dissolved in the solvent of the material of the second film.

The thickness of the second layer is, for example, 2 microns. In manufacturing blocking-layer cells, like with vacuous discharge-tubes, care is taken to see that the distance from the grid to the cathode is smaller than that from the grid to the anode, since the amplification of a triode is determined by the ratio between these distances.

The manufacture of film 4 is followed by the application of the cathode which may consist of the low-melting alloy of tin, bismuth and cadmium having a melting point of 103° C.

Figure 2:
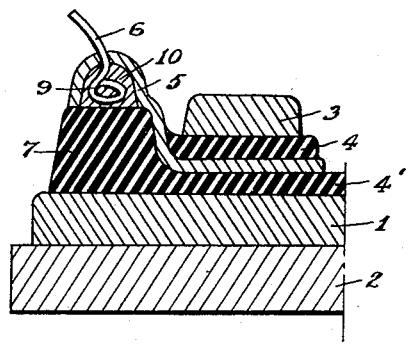
Fig. 2 shows a variety giving more details about the connection of the supply conductor to the grid.

In Fig. 2, the various parts may consist of the same materials as described above. It appears from the figures that here again the larger distance from the grid-supply-conductor 6 to the anode 1 is obtained by the thickening 7. In this case the thickening is also utilised for the attachment of the supply conductor 6 which consists of a little wire bent into a spiral 9 at the end. This end is first immersed in liquid solder (for example, the alloy referred to above which melts at approximately 100° C.) and subsequently placed on the elevation 7, during which operation the solder coagulates and attaches itself to the polystyrene of the elevation 7. Next, the brass layer 5 is applied by vaporisation so as to cover entirely the hardened solder drop 10, thus forming the electric connection. The conversion into brass iodide that subsequently follows will be limited as far as possible to the brass layer which is located between the films 4 and 4' so that the brass layer on the elevation 7 remains conductive.

Figure 3:
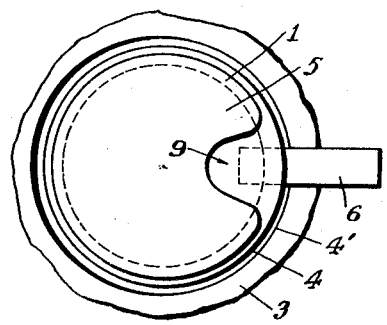
Fig. 3 shows a form of construction in which the anode re-enters in a direction normal to the electron path and in which the grid supply-conductor is led-out laterally. For clearness' sake, in this figure the cell is shown in plan view.

Fig. 3 is a plan of a cell in which the assembly is effected in the reversed order. As appears even more clearly from Fig. 4, one starts from the cathode 3 either in the form of an individual plate, or supported by a plate 2. The cathode 3 has first superposed on it the blocking layer 4' which carries the grid 5 (shown in dotted line). The latter is covered with the second blocking film 4 on which bears the anode 1 which may be constituted by a disc moulded from powdery material, for example lead sulphide or another semi-conductor. To obtain a larger distance to the conductor 6, the anode disc 1 is provided with a depression 9.

In Fig. 4, the anode 1 has an annular shape. In this case the grid supply-conductor is constituted by a disc 10 of conductive material, for example brass, which is in good electric contact with the grid 5 on the one hand and with the lead-out wire 6 on the other hand. The bottom end of the wire may be helically wound and thus soldered to the disc 10.

The internal diameter of the disc-shaped anode is such that the smallest distance from the disc or the spiral to the anode is larger than the thickness of the blocking film 4. Consequently, in this case also it is impossible for the electrical values of the cell to be acted upon by the grid supply-conductor.

This structure may also be used if the anode bears on the carrier plate 2, for example in the form of a selenium layer, the cathode in this case having an annular shape and the grid supply-conductor running through the central aperture thereof.

Fig. 5 shows an example of a cell having a plurality of grids.

Again, the anode 1 is provided on a carrier plate 2. The former may consist of selenium and the second of aluminium. A film 4 from a solution of polystyrene in benzene is applied to the anode, which film has formed on it the grid 5. An annular elevation 11 which, if desired, consists of an insulating material identical with that constituting the blocking film 4 serves to space the supply conductor 6 from the anode by a distance larger than the thickness of the film 4.

The second blocking layer 4' is formed on the grid 5 and this may be effected by applying Canada balsam dissolved in turpentine. The second grid 5' is applied to this film in known manner, This grid has a supply conductor 6' which is spaced by the annular insulated elevation 11'.

The last blocking film 4" is applied by utilising a solution of chlorinated rubber lacquer in xylene.

Finally the cathode of Rose's metal is applied, for example by spraying.

It may be mentioned that the ratio between the thicknesses of the various layers shown in the drawing is not in conformity with reality, but is indicated for clearness' sake, as appears from the figures.

The elevation 7, for example, will generally be considerably higher in practice than shown, in comparison with the thicknesses of the various films, since the latter have a thickness in the order of magnitude of microns, whereas the elevation 7 may, without any objection, have a thickness of, say, 1 mm. Further, the surfaces of the carrier plate 2 and of the electrode directly applied thereto will generally extend over a much greater length than the surface of the following films, since it is desired to limit the capacity of the complete blocking-layer cell. This is shown in the figures by braking-off the carrier plate and the electrode directly superjacent (if desired also the first blocking film) at one or both sides (dot-and-dash line in Figs. 2 and 4).

What I claim is:

1. A barrier layer cell, comprising in combination, an anode, a cathode, a barrier layer intermediate said anode and said cathode, at least one grid embedded in said barrier layer, a metallic supply conductor associated with said grid, a portion of insulating material separating said supply conductor from said anode and having a thickness greater than the distance between the associated grid and the anode, and a portion of low-melting metal on said insulating portion for attaching said supply conductor, said grid extending into contact with said metal portion.

2. A barrier layer cell, comprising in combination, an anode, a cathode, a barrier layer intermediate said anode and said cathode, at least one grid embedded in said barrier layer, and a metallic supply conductor associated with said grid, said anode comprising an aperture opposite the grid, said supply conductor extending through said aperture at a distance from the anode greater than the distance between the associated grid and the anode.

3. A barrier layer cell, comprising in combination, an anode, a cathode, a barrier layer intermediate said anode and said cathode, at least one grid embedded in said barrier layer, said grid extending over an area materially smaller than the area covered by said anode, a metallic supply conductor associated with said grid, said conductor extending in the vicinity of said anode to reach said grid, and means comprising an insulating member interposed between the conductor and the anode and arranged in said vicinity for spacing said conductor from the anode by a distance materially exceeding the distance between said grid and said anode.

4. A barrier layer cell, comprising in combination, an anode, a cathode, a barrier layer intermediate said anode and said cathode, at least one grid embedded in said barrier layer, said grid extending over an area materially smaller than the area covered by said anode, a metallic supply conductor associated with said grid, said conductor extending in the vicinity of said anode to reach said grid, and means arranged in said vicinity for spacing said conductor from the anode by a distance materially exceeding the distance between said grid and said anode, said means comprising a shield of insulating material whereby to shield said supply conductor from said anode.

5. A barrier layer cell, comprising in combination, an anode, a cathode, a barrier layer intermediate said anode and said cathode, at least one grid embedded in said barrier layer, said grid extending over an area materially smaller than the area covered by said anode, a metallic supply conductor associated with said grid, said conductor extending in the vicinity of said anode to reach said grid, and means arranged in said vicinity for spacing said conductor from the anode by a distance materially exceeding the distance between said grid and said anode, said means comprising a thickening of the barrier layer whereby to shield said supply conductor from said anode.

6. A barrier layer cell, comprising in combination, an anode, a cathode, a barrier layer intermediate said anode and said cathode, at least one grid embedded in said barrier layer, said grid extending over an area materially smaller than the area covered by said anode, a metallic supply conductor associated with said grid, said conductor extending in the vicinity of said anode to reach said grid, and means arranged in said vicinity for spacing said conductor from the anode by a distance materially exceeding the distance between said grid and said anode, said means comprising a cut-out portion in said anode whereby to eliminate the portion of the anode adjacent to the approaches of the supply conductor to the grid.

WILLEM CHRISTIAAN van GEEL.

REFERENCES CITED

The following references are of record in the file of this patent:

UNITED STATES PATENTS

| Number | Name | Date |
|---|---|---|
| 2,328,440 | Esseling et al. | Aug. 31, 1943 |

FOREIGN PATENTS

| Number | Country | Date |
|---|---|---|
| 500,180 | Great Britain | Feb. 3, 1939 |
| 500,342 | Great Britain | Feb. 7, 1939 |
| 500,344 | Great Britain | Feb. 7, 1939 |